US012064862B2

(12) United States Patent
Chang

(10) Patent No.: US 12,064,862 B2
(45) Date of Patent: Aug. 20, 2024

(54) SOCKET HOLDER

(71) Applicant: CHUN NIEN PLASTIC LTD., Taichung (TW)

(72) Inventor: Chi-Tsai Chang, Taichung (TW)

(73) Assignee: CHUN NIEN PLASTIC LTD., Taichung (TW)

( * ) Notice: Subject to any disclaimer, the term of this patent is extended or adjusted under 35 U.S.C. 154(b) by 0 days.

(21) Appl. No.: 18/074,961

(22) Filed: Dec. 5, 2022

(65) Prior Publication Data

US 2023/0219210 A1 Jul. 13, 2023

(30) Foreign Application Priority Data

Jan. 12, 2022 (TW) ................................ 111200414

(51) Int. Cl.
*B25H 3/00* (2006.01)

(52) U.S. Cl.
CPC .................................... *B25H 3/003* (2013.01)

(58) Field of Classification Search
CPC . B25H 3/003; B25H 3/00; B25H 3/04; B25H 3/06
USPC ......... 81/438; 211/70.6, 49.1; 206/378, 349, 206/493, 376, 379; 403/361
See application file for complete search history.

(56) References Cited

U.S. PATENT DOCUMENTS 5,467,874 A * 11/1995 Whitaker ................. B25H 3/06 248/309.2
6,032,797 A * 3/2000 Kao ......................... B25H 3/04 206/349
7,152,747 B2 * 12/2006 Wang .................... A47F 5/0006 211/70.6
7,374,042 B2 * 5/2008 Liu ........................ B25H 3/003 206/372
8,499,935 B2 * 8/2013 Hsieh ....................... B25H 3/04 206/349
8,955,698 B2 * 2/2015 Hsieh ..................... B25H 3/003 206/378
9,528,303 B1 * 12/2016 Lai ........................ A47F 5/0861
9,604,771 B1 * 3/2017 Chen .................. B65D 73/0064
9,782,890 B2 * 10/2017 Hsieh ....................... B25H 3/04
11,007,625 B2 * 5/2021 Chen ................... B25B 23/0028
11,090,799 B2 * 8/2021 Wang ..................... B25H 3/003
11,420,320 B2 * 8/2022 Chang .................... B25H 3/003
2003/0150824 A1 * 8/2003 McNeely ............... B25H 3/003 206/378

(Continued)

*Primary Examiner* — Steven A. Reynolds
*Assistant Examiner* — Prince Pal
(74) *Attorney, Agent, or Firm* — MUNCY, GEISSLER, OLDS & LOWE, P.C.

(57) ABSTRACT

A socket holder is provided, including: a base; a post, including a top wall, a circumferential wall, at least one first convexity and at least one second convexity, the circumferential wall being connected laterally to and between the base and the top wall, the at least one first convexity and the at least one second convexity being radially protrusive on the circumferential wall, the at least one first convexity being configured to be engaged in a socket, the at least one second convexity being configured to be abutted against an inner wall of the socket; wherein the at least one first convexity defines a first centerline extending circumferentially, the at (Continued)

least one second convexity defines a second centerline extending circumferentially, and the first centerline and the second centerline are axially offset.

8 Claims, 8 Drawing Sheets

(56) References Cited

U.S. PATENT DOCUMENTS

| | | | | |
|---|---|---|---|---|
| 2005/0218023 | A1* | 10/2005 | Winnard | B25H 3/003 206/378 |
| 2005/0221664 | A1* | 10/2005 | Winnard | B25H 3/003 439/510 |
| 2006/0254940 | A1* | 11/2006 | Mu | B25H 3/003 206/378 |
| 2007/0012587 | A1* | 1/2007 | Wang | B25H 3/003 206/349 |
| 2008/0157489 | A1* | 7/2008 | Kao | B25H 3/003 279/97 |
| 2010/0065520 | A1* | 3/2010 | Hsieh | B25H 3/06 211/70.6 |
| 2011/0089126 | A1* | 4/2011 | Hsieh | B25H 3/06 211/70.6 |
| 2012/0061339 | A1* | 3/2012 | Chang | B65D 73/0064 211/70.6 |
| 2012/0096698 | A1* | 4/2012 | Ernst | B25H 3/04 403/360 |
| 2013/0068643 | A1* | 3/2013 | Hsieh | B25H 3/04 206/349 |
| 2014/0209780 | A1* | 7/2014 | Chang | A47F 5/0006 248/551 |
| 2015/0165615 | A1* | 6/2015 | Lee | B25H 3/003 206/349 |
| 2017/0043475 | A1* | 2/2017 | Hsieh | B25H 3/04 |
| 2017/0232606 | A1* | 8/2017 | Kao | B25H 3/003 211/70.6 |
| 2018/0065792 | A1* | 3/2018 | Chen | B25H 3/003 |
| 2018/0209483 | A1* | 7/2018 | Yu | B25B 23/0014 |
| 2019/0091842 | A1* | 3/2019 | Chou | B25B 13/06 |
| 2019/0366531 | A1* | 12/2019 | Hu | B25H 3/04 |
| 2020/0072294 | A1* | 3/2020 | Chen | F16D 3/20 |
| 2020/0101590 | A1* | 4/2020 | Winnard | B25H 3/003 |
| 2021/0060761 | A1* | 3/2021 | Chang | B25H 3/003 |
| 2023/0234194 | A1* | 7/2023 | Hsieh | B25B 23/0035 81/121.1 |

* cited by examiner

SOCKET HOLDER

BACKGROUND OF THE INVENTION

Field of the Invention

The present invention relates to a socket holder.

Description of the Prior Art

After the socket is disassembled from the packing wear such as a box or the like, it is usually stored in the tool box. However, the socket can move and roll freely in the tool box, which causes unnecessary collisions or hiding among components. Therefore, some storage devices are developed for storing and positioning the socket. The storage device generally includes a rail and a seat that is slidably installed on the rail. The seat includes a post and a shrapnel which is relatively swingable relative to the post, and the shrapnel includes a convex. The convex is able to urge the socket by the elastic force of the shrapnel to achieve the retaining effect. The shrapnel is compressed to release engagement of the convex and the socket when there is a need to take off the socket.

However, the shrapnel of the conventional storage device will become elastically fatigued after long-term use, which results in a gradual deterioration of its elastic force and affects the effect of positioning the socket. As a result, the socket can disengage from the storage device easily. The present invention is, therefore, arisen to obviate or at least mitigate the above-mentioned disadvantages.

SUMMARY OF THE INVENTION

The main object of the present invention is to provide a socket holder which provides good and reliable engagement of a socket therewith.

To achieve the above and other objects, a socket holder is provided, including: a base; a post, configured for assembling of a socket, defining an axial direction, a radial direction and a circumferential direction, including a top wall, a circumferential wall, at least one first convexity and at least one second convexity, the circumferential wall being connected laterally to and between the base and the top wall, the at least one first convexity and the at least one second convexity being protrusive in the radial direction on the circumferential wall, the at least one first convexity being configured to be engaged in at least one positioning hole of the socket, the at least one second convexity being configured to be abutted against an inner wall of the socket; wherein the at least one first convexity defines a first centerline extending in the circumferential direction, the at least one second convexity defines a second centerline extending in the circumferential direction, and the first centerline and the second centerline are offset in the axial direction. The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
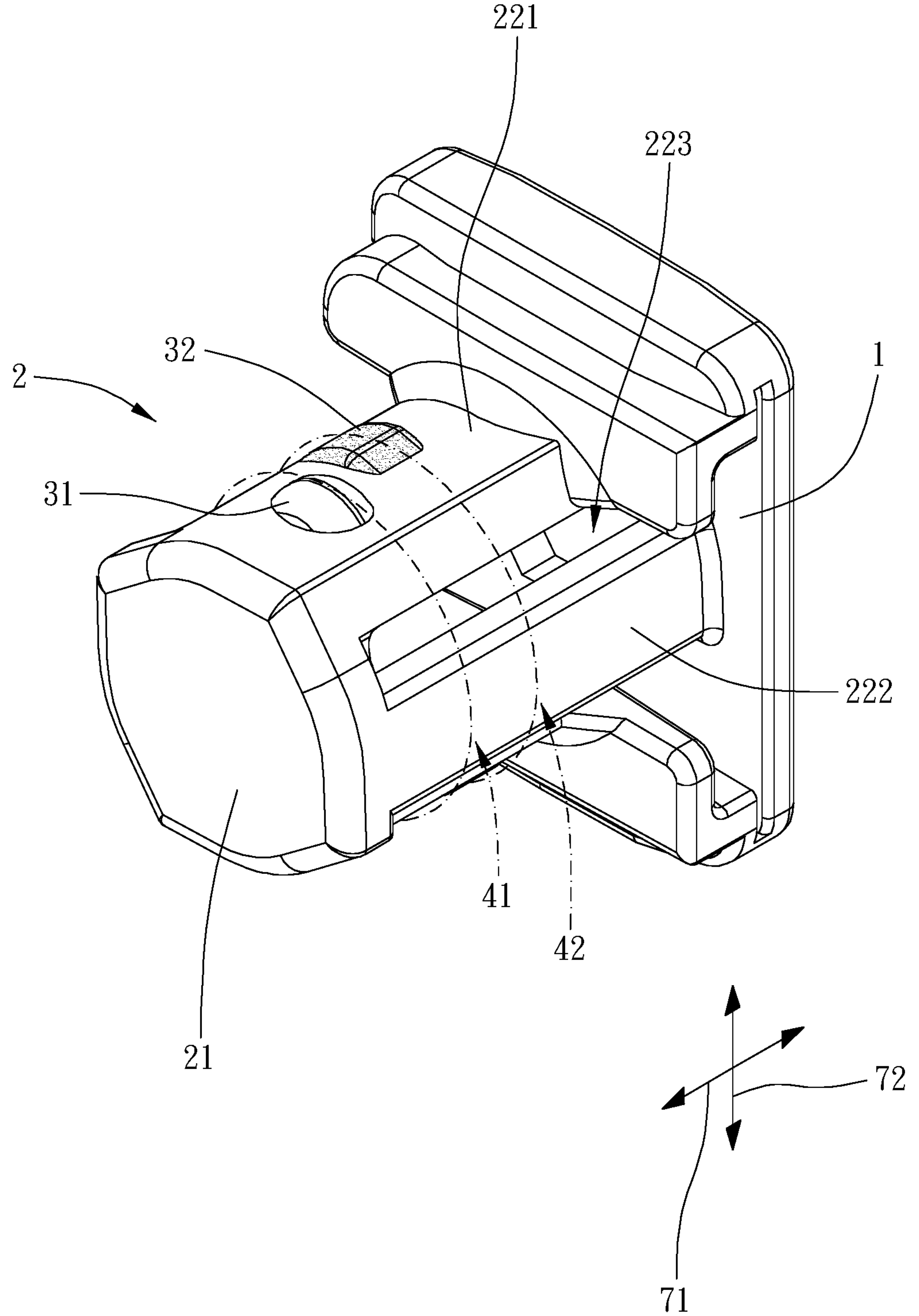
FIG. 1 is a stereogram of a first preferable embodiment of the present invention.
Figure 2:
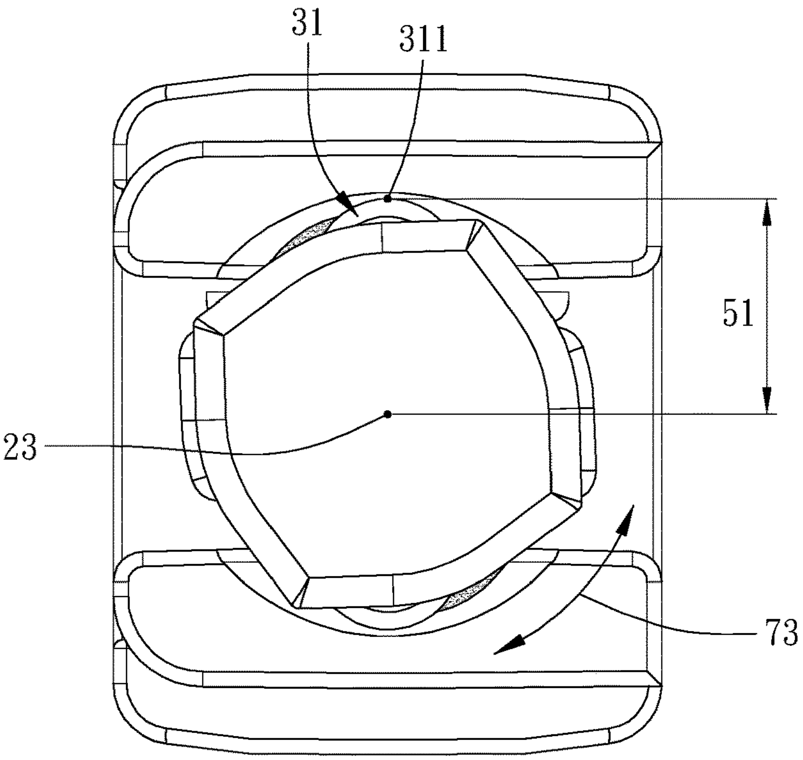
FIG. 2 is a top view of FIG. 1.
Figure 3:
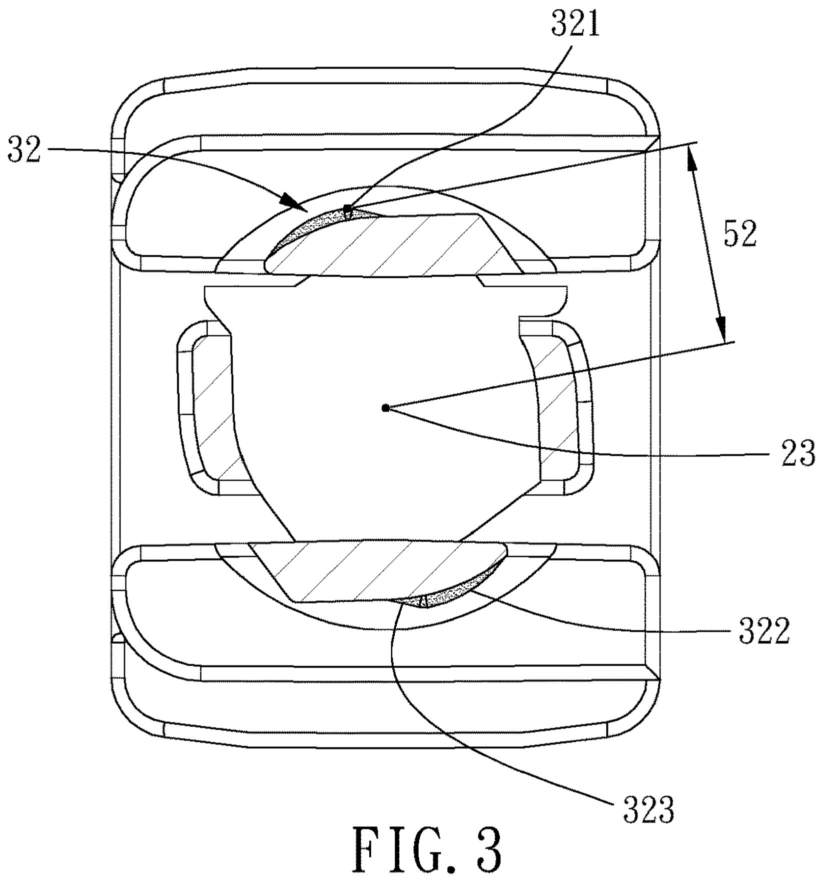
FIG. 3 is a cross-sectional view of FIG. 2.
Figure 4:
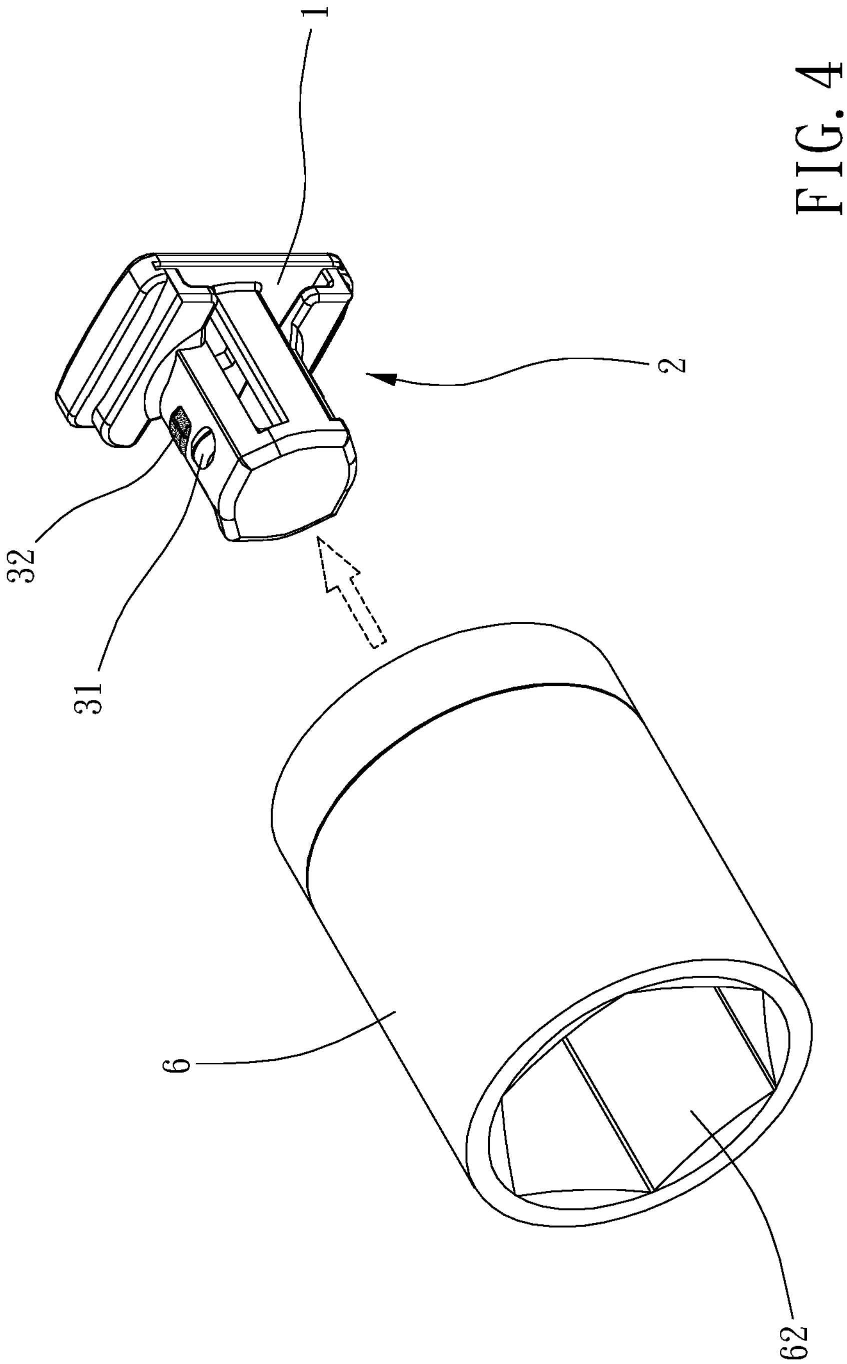
FIG. 4 is a drawing showing a socket being assembled to a socket holder according to the first preferable embodiment of the present invention.
Figure 5:
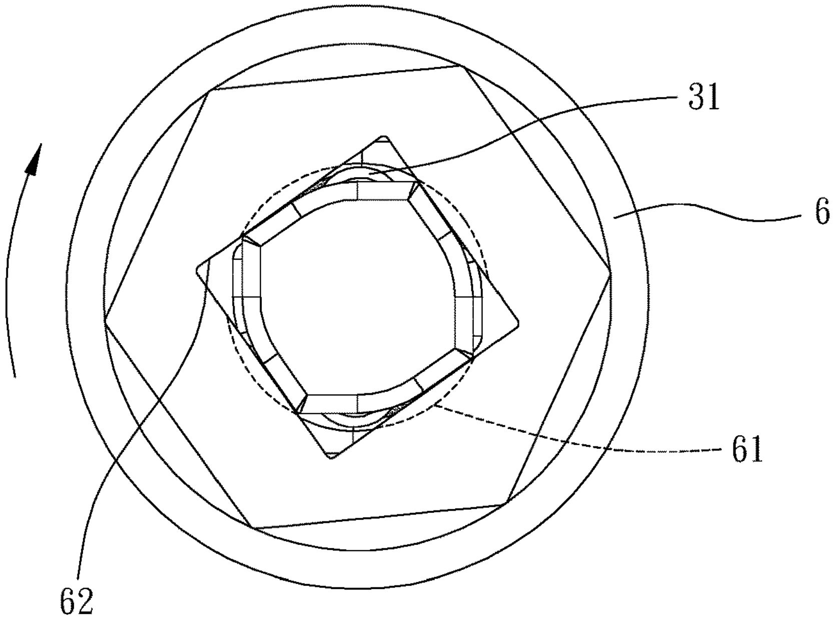
FIGS. 5 and 6 are drawings showing the socket being rotated to be positioned to the socket holder according to the first preferable embodiment of the present invention.
Figure 6:
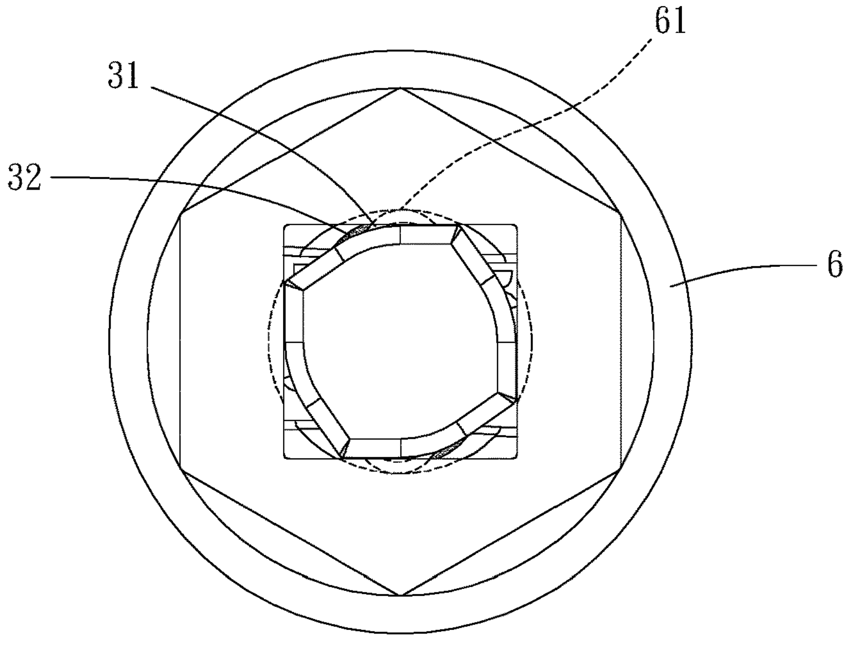
Figure 7:
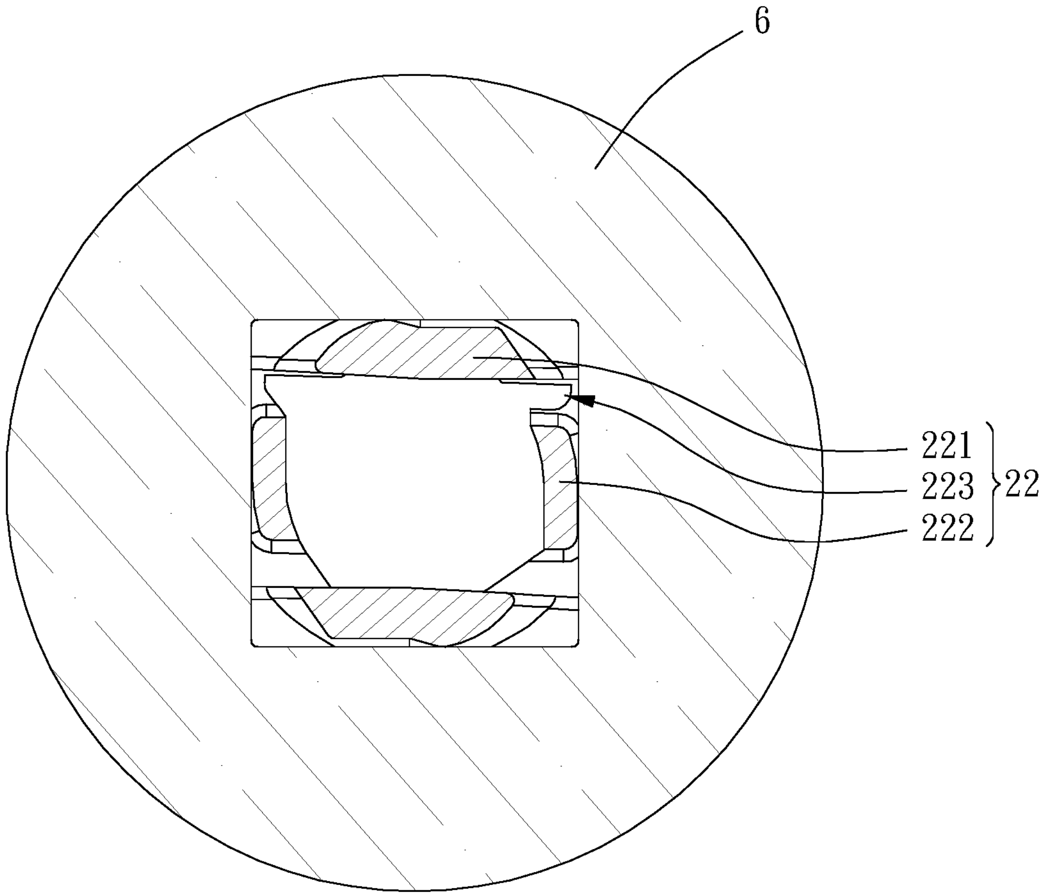
FIG. 7 is a cross-sectional view of FIG. 6.
Figure 8:
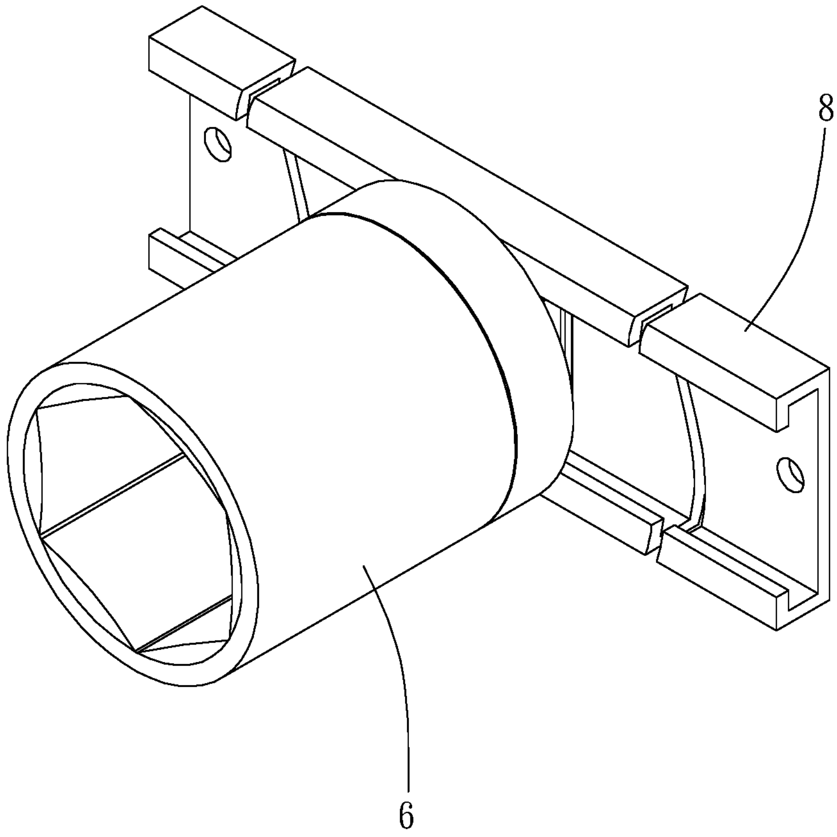
FIG. 8 is a drawing showing an application of a preferable embodiment of the present invention.
Figure 9:
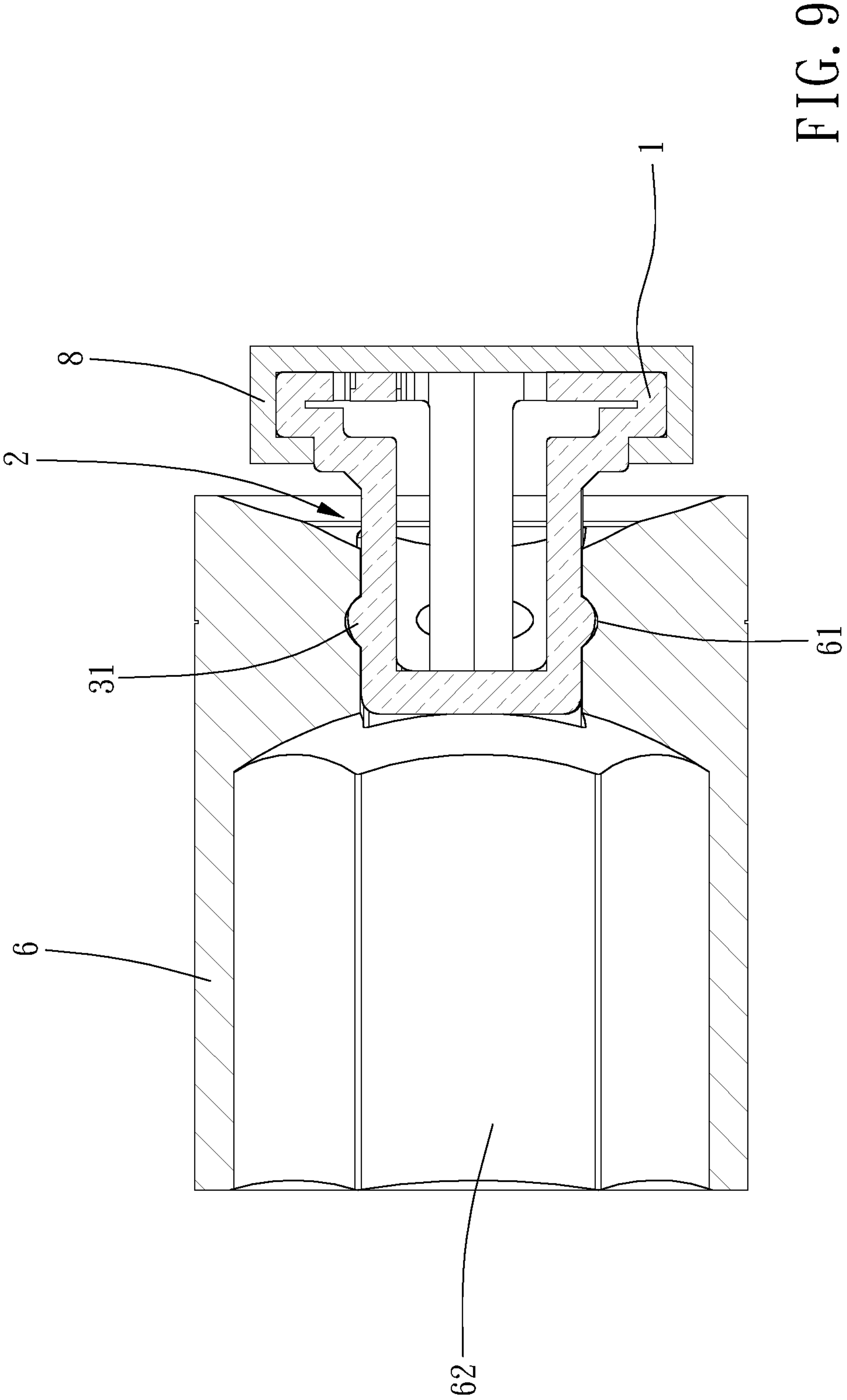
FIG. 9 is a cross-sectional view of FIG. 8.

Please refer to FIGS. 1 to 9 for a preferable embodiment of the present invention. A socket holder 1 of the present invention includes a base 1 and a post 2.

The base 1 is detachably and slidably mounted to a rail 8 so that it is adjustable in position according to various requirements during use. The post 2 is configured for assembling of a socket 6. The post 2 defines an axial direction 71, a radial direction 72 and a circumferential direction 73, and the post 2 includes a top wall 21, a circumferential wall 22, at least one first convexity 31 and at least one second convexity 32. The circumferential wall 22 is connected laterally to and between the base 1 and the top wall 21. The at least one first convexity 31 and the at least one second convexity 32 are protrusive in the radial direction 72 on the circumferential wall 22. The at least one first convexity 31 is configured to be engaged in at least one positioning hole 61 of the socket 6, and the at least one second convexity 32 is configured to be abutted against an inner wall 62 of the socket 6. The at least one first convexity 31 defines a first centerline 41 extending in the circumferential direction 73, and the at least one second convexity 32 defines a second centerline 42 extending in the circumferential direction 73. The first centerline 41 and the second centerline 42 are offset in the axial direction 71 so that the at least one first convexity 31 and the at least one second convexity 32 provides good multi-engagement of the post 2 with the socket 6.

The at least one first convexity 31 can be used to position the socket 6. The at least one second convexity 32 can achieve effects of stable operation during turning the socket 6 relative to the post 2 to align the at least one positioning hole 61 and the at least one first convexity 31, and of stable engagement with the inner wall 62 of the socket 6 as the at least one first convexity 31 is engaged in the at least one positioning hole 61.

The post 2 further includes an axis 23, a distance from a first vertex 311 of the at least one first convexity 31 to the axis 23 is defined as a first distance 51, a distance from a second vertex 321 of the at least one second convexity 32 to the axis 23 is defined as a second distance 52, and the first distance 51 is larger than the second distance 52, thus avoiding overtight engagement of the at least one second convexity 32 with the inner wall 62 of the socket 6.

Specifically, the at least one first convexity 31 has an outer profile different from an outer profile of the at least one second convexity 32. For example, the outer profile of the at least one first convexity 31 is a part of a sphere, which is advantageous to smoothly engagement of the at least one first convexity 31 into the at least one positioning hole 61.

The at least one second convexity 32 is preferably hill-shaped, which is advantageous to effective engagement.

Specifically, the outer profile of the at least one first convexity 31 has a fixed curvature, and the outer profile of the at least one second convexity 32 includes a first surface 322 and a second surface 323 whose curvatures are different; in the circumferential direction 73, the first surface 322 has an extent larger than an extent of the second surface 323; the second surface 323 is connected to the first surface 322 in the circumferential direction 73, and the curvature of the second surface 323 is smaller than the curvature of the first surface 322.

The circumferential wall 22 includes two first walls 221 arranged correspondingly, two second walls 222 arranged correspondingly and four slots 223. Each of two sides of each of the two second walls 222 is connected laterally to one of the two first walls 221, each of the two second walls 222 includes two of the four slots 223, and each of the four slots 223 extends in the axial direction 71. Each of the four slots 223 provides elastic deformability of each of the two first walls 221.

In this embodiment, the at least one first convexity includes two first convexities 31, the at least one second convexity includes two second convexities 32, and each of the two first walls 221 includes one of the two first convexities 31 and one of the two second convexities 32. A height that each of the at least one second convexity 32 is protrusive beyond the first wall 221 is at least 0.5 times larger than a height that each of the at least one first convexity 31 is protrusive beyond the first wall 221, which provides sufficiently smooth rotation and sufficient engagement. In the axial direction 71, the first convexity 31 and the second convexity 32 partially overlap for providing good positioning effect, while the first convexity 31 and the second convexity 32 do not overlap in the circumferential direction 73 for engagement with the socket 6 under different levels. As viewed in a direction toward the top wall 21, the at least one second convexity 32 and the first convexity 31 are arranged in order in a clockwise direction, which provides gradually strong engagements with the socket 6.

Figure 10:
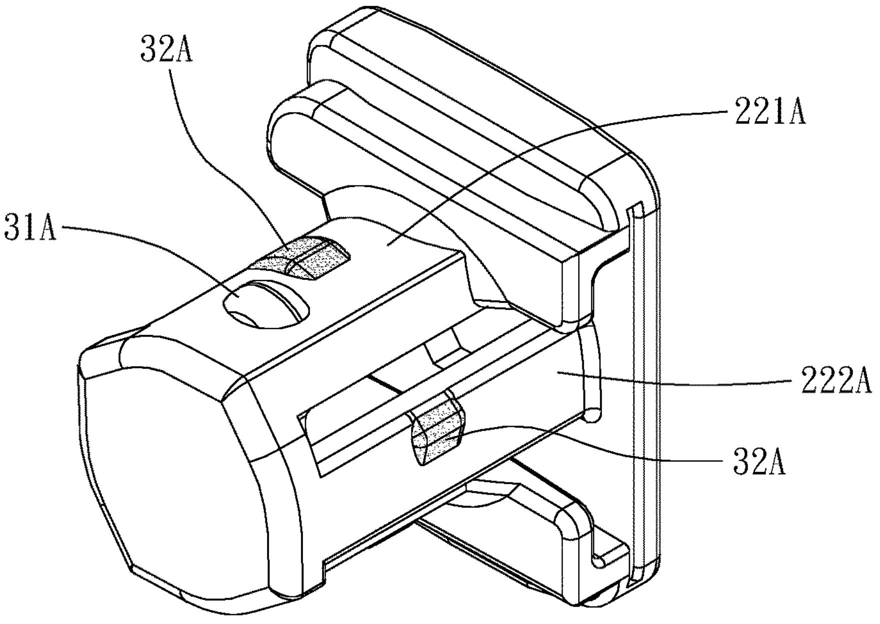
FIG. 10 is a stereogram of a second preferable embodiment of the present invention.

FIG. 10 shows a second embodiment. In the second embodiment, the at least one first convexity includes two first convexities 31A, the at least one second convexity includes four second convexities 32A, each of the two first walls 221A includes one of the two first convexities 31A and one of the four second convexities 32A, and each of the two second walls 222A includes one of the four second convexities 32A.

Figure 11:
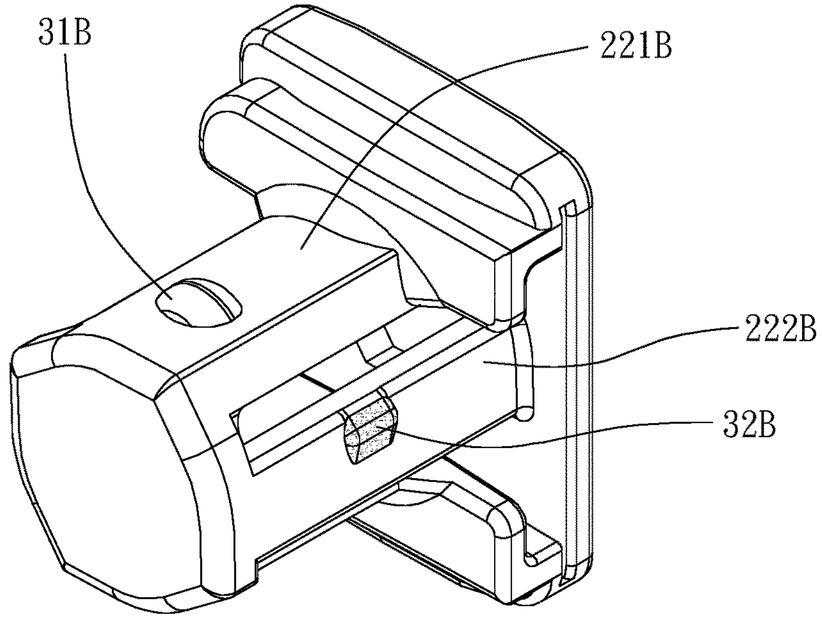
FIG. 11 is a stereogram of a third preferable embodiment of the present invention.

FIG. 11 shows a third embodiment. In the third embodiment, the at least one first convexity includes two first convexities 31B, the at least one second convexity includes two second convexities 32B, each of the two first walls 221B includes one of the two first convexities 31B, and each of the two second walls 222B includes one of the two second convexities 32B.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A socket holder, including:

a base;

a post, configured for assembling of a socket, defining an axial direction, a radial direction and a circumferential direction, including a top wall, a circumferential wall, at least one first convexity and at least one second convexity, the circumferential wall being connected laterally to and between the base and the top wall, the at least one first convexity and the at least one second convexity being protrusive in the radial direction on the circumferential wall, the at least one first convexity being configured to be engaged in at least one positioning hole of the socket, the at least one second convexity being configured to be abutted against an inner wall of the socket;

wherein the at least one first convexity defines a first centerline extending in the circumferential direction, the at least one second convexity defines a second centerline extending in the circumferential direction, and the first centerline and the second centerline are offset in the axial direction;

wherein an outer profile of the at least one first convexity is a part of a sphere;

wherein an outer profile of the at least one second convexity includes a first surface and a second surface, and in the circumferential direction the first surface has an extent larger than an extent of the second surface;

wherein the circumferential wall includes two first walls arranged correspondingly, two second walls arranged correspondingly and four slots, each of two sides of each of the two second walls is connected laterally to one of the two first walls, each of the two second walls includes two of the four slots, and each of the four slots extends in the axial direction.

2. The socket holder of claim 1, wherein the post further includes an axis, a distance from a first vertex of the at least one first convexity to the axis is defined as a first distance, a distance from a second vertex of the at least one second convexity to the axis is defined as a second distance, and the first distance is larger than the second distance.

3. The socket holder of claim 1, wherein the outer profile of the at least one first convexity has a fixed curvature, and a curvature of the first surface and a curvature of the second surface are different.

4. The socket holder of claim 3, wherein the second surface is connected to the first surface in the circumferential direction, and the curvature of the second surface is smaller than the curvature of the first surface.

5. The socket holder of claim 1, wherein the at least one first convexity includes two first convexities, the at least one second convexity includes two second convexities, and each of the two first walls includes one of the two first convexities and one of the two second convexities.

6. The socket holder of claim 5, wherein a portion of the at least one first convexity and a portion of the at least one second convexity are located on a same line in the axial direction.

7. The socket holder of claim 1, wherein the at least one first convexity and the at least one second convexity are separate and are distanced from each other in the axial direction.

8. The socket holder of claim 6, wherein the post further includes an axis, a distance from a first vertex of the at least one first convexity to the axis is defined as a first distance, a distance from a second vertex of the at least one second convexity to the axis is defined as a second distance, and the first distance is larger than the second distance; the outer profile of the at least one first convexity has a fixed curvature, and a curvature of the first surface and a curvature of the second surface are different; the second surface is connected to the first surface in the circumferential direction, and the curvature of the second surface is smaller than the curvature of the first surface; the at least one first convexity and the at least one second convexity are separate and are distanced from each other in the axial direction; a height that each of the at least one second convexity is protrusive beyond the first wall is at least 0.5 times larger than a height that each of the at least one first convexity is protrusive beyond the first wall; as viewed in a direction toward the top wall, the at least one second convexity and the first convexity are arranged in order in a clockwise direction; the base is detachably and slidably mounted to a rail.

* * * * *